(12) United States Patent
Schlueter et al.

(10) Patent No.: US 9,447,629 B2
(45) Date of Patent: Sep. 20, 2016

(54) STRIP GASKET

(71) Applicants: Jonathan Schlueter, Chanhassen, MN (US); Nathan L. Westby, Zimmer, MN (US); Trent Jones, White Bear Lake, MN (US); Lisa Salmi, Prior Lake, MN (US); Larry Krynski, Lakeville, MN (US)

(72) Inventors: Jonathan Schlueter, Chanhassen, MN (US); Nathan L. Westby, Zimmer, MN (US); Trent Jones, White Bear Lake, MN (US); Lisa Salmi, Prior Lake, MN (US); Larry Krynski, Lakeville, MN (US)

(73) Assignee: Hoffman Enclosures, Inc., Anoka, MN (US)

( * ) Notice: Subject to any disclaimer, the term of this patent is extended or adjusted under 35 U.S.C. 154(b) by 0 days.

(21) Appl. No.: 14/516,430

(22) Filed: Oct. 16, 2014

(65) Prior Publication Data

US 2016/0108662 A1    Apr. 21, 2016

(51) Int. Cl.
*A47B 95/00* (2006.01)
*E06B 7/23* (2006.01)

(52) U.S. Cl.
CPC .......... *E06B 7/2312* (2013.01); *E06B 7/2314* (2013.01)

(58) Field of Classification Search
CPC .................................................. F25D 23/087
USPC .................... 277/341, 572, 651; 312/296
See application file for complete search history.

(56) References Cited

U.S. PATENT DOCUMENTS

| | | | |
|---|---|---|---|
| 3,555,168 A | 1/1971 | Frykberg | |
| 4,614,347 A * | 9/1986 | Kruschwitz | B60J 10/0005 277/637 |
| 4,690,414 A * | 9/1987 | Haaland | B28B 21/563 277/604 |
| 4,857,668 A | 8/1989 | Buonanno | |
| 5,214,242 A | 5/1993 | Gallagher | |
| 5,262,588 A | 11/1993 | Gallagher | |
| 5,551,706 A | 9/1996 | Barna | |
| 6,551,425 B2 | 4/2003 | Sylvester | |
| 7,375,291 B2 | 5/2008 | Ariel | |
| 7,473,855 B2 * | 1/2009 | Rutherford | H05K 9/0015 174/356 |
| 2006/0260838 A1 | 11/2006 | Ariel | |
| 2009/0114438 A1 | 5/2009 | van Haaster | |

FOREIGN PATENT DOCUMENTS

| | | |
|---|---|---|
| EP | 392821 B2 | 12/1997 |
| EP | 2649389 B1 | 10/2013 |
| GB | 1409441 A | 10/1975 |

OTHER PUBLICATIONS

Pentair Design, Products, http://www.pentairprotect.com/en/na/Application-HazardousExplosionEnvironment-WallMount/zonex%E2%84%A2-atex--and-iecex-certified-type-4x, webpage accessed on Jan. 16, 2015.
Cooper Industries, Modified Enclosures, http://www.cooperindustries.com/content/public/en/b-line/about_us/News/modified-enclosure.html, Dec. 17, 2013.
(Continued)

*Primary Examiner* — Matthew Ing
(74) *Attorney, Agent, or Firm* — Quarles & Brady LLP

(57) ABSTRACT

Embodiments provide a strip gasket with one or more adhesive strips on the gasket. The strip gasket resists stretching because a non-stretchable carrier is located within an adhesive strip on the gasket which helps prevent the gasket from being stretched. The strip gasket is also able to create a tight seal when it is installed against a desired surface. This tight seal prevents water and other particulate matter from passing around the strip gasket.

19 Claims, 5 Drawing Sheets

(56) References Cited

OTHER PUBLICATIONS

Hammond Manufacturing, Industrial Enclosures, https://www.hammfg.com/electrical/products/industrial, Jun. 30, 2013.

Saginaw, Product Line, http://www.saginawcontrol.com/product-lines, Sep. 25, 2011.

Hubbell-Wiegmann, Section C Index, http://www.hubbell-wiegmann.com/catalog/sectionC.pdf, webpage accessed on Jan. 16, 2015.

Rittal—The System, Industrial Enclosures Solutions, Issue 5, Australia and New Zealand, http://www.rittal.com/imf/none/5_990/&rct=j&frm=1&q=&esrc=s&sa=U&ei=bKmkU-WDM6rNsATJ9oGYCg&ved=0CE0QFjAK&usg=AFQjCNGx6ePtKBjUlu_1HiiFac8xs8ZUHw, webpage accessed on Jan. 16, 2015.

EMI Gaskets—Conductive Rubber/Silicone & Combination, Product information. Feb. 6, 2015, Stockwell Elastomerics, Inc., Retrieved Mar. 16, 2016 from <http://www.stockwell.com/emi-gaskets.php#conductive>.

\* cited by examiner

STRIP GASKET

BACKGROUND

Gaskets are mechanical devices used to provide a leak-tight seal between two slightly irregular mating surfaces, such as an enclosure and its doors and accessories. In many indoor and outdoor applications, a properly mounted, well-performing gasket is critical to the protection of sensitive electrical and electronic equipment inside the enclosure. Gaskets can be used to exclude matter in the external environment such as dust, dirt, and water, from entering an enclosure.

Strip gaskets are a commonly used type of gasket for sealing, enclosures. When installing strip gaskets, manufacturers may adhere rolls, or strips of a gasket to an enclosure surface and then cut the strip to an exact measurement. Strip gaskets typically have a single layer of adhesive on one side of the gasket which allows it to adhere to a desired surface. Because the gaskets were in a roll prior to installation, the gaskets may have a curved shape which can cause a void or space to appear between the strip gasket and a surface on which the strip gasket is applied. These voids or spaces can allow water or other particulate matter to enter the enclosure under the gasket.

Further, multiple pieces of strip gaskets may be used to completely cover a desired surface. However, when multiple pieces of strip gaskets are connected together to cover a desired surface, this method of installation creates a seam in each corner or joint between the interconnecting gasket pieces. These seams may make the gasket more vulnerable to wear and damage over time.

Strip gaskets applied to enclosure doors during assembly at a manufacturing plant also tend to get stretched during the assembly operation. The strip gaskets are placed into the enclosure doors and then cut to match tightly at the corners. A tight fit between the pieces of the strip gaskets is critical in attempting keeping water or other particulate matter out of the enclosure. Stretched gaskets will shrink to their original length over time, causing them to separate from one another. This separation allows water and other matter to penetrate under the gasket at the gasket joints.

Therefore, there exists a need for a strip gasket which will not stretch, while also preventing water and other matter from entering under the gasket and into an enclosure.

SUMMARY OF THE INVENTION

Embodiments of the disclosure provide a strip gasket for an enclosure, the strip gasket comprising a base having a first surface, a plurality of adhesive strips on the first surface wherein a first adhesive strip includes a first adhesive and a non-stretchable carrier for the first adhesive and a second adhesive strip includes an second adhesive.

Embodiments of the disclosure also provide a strip gasket for an enclosure, the strip gasket comprising a base having a first surface, a single adhesive strip on the first surface where a first section of the single adhesive strip includes a first adhesive and a non-stretchable carrier for the first adhesive and a second section of the single adhesive strip includes an second adhesive.

Embodiments of the disclosure also provide an enclosure having a strip gasket, the enclosure comprising a body having a front surface wherein the front surface includes a first outer periphery portion, a door having an inner surface wherein the inner surface includes a second outer periphery portion, a strip gasket having a base section, a first adhesive strip and a second adhesive strip wherein the first adhesive strip includes a non-stretchable carrier, and wherein the strip gasket is applied along the second outer periphery portion of the door such that the strip gasket can come in contact with the first outer periphery of the body when the door is closed and abuts against the front surface of the body.

These and other features, aspects, and advantages of the present disclosure will become better understood upon consideration of the following detailed description, drawings, and appended claims.

DETAILED DESCRIPTION

Figure 1:
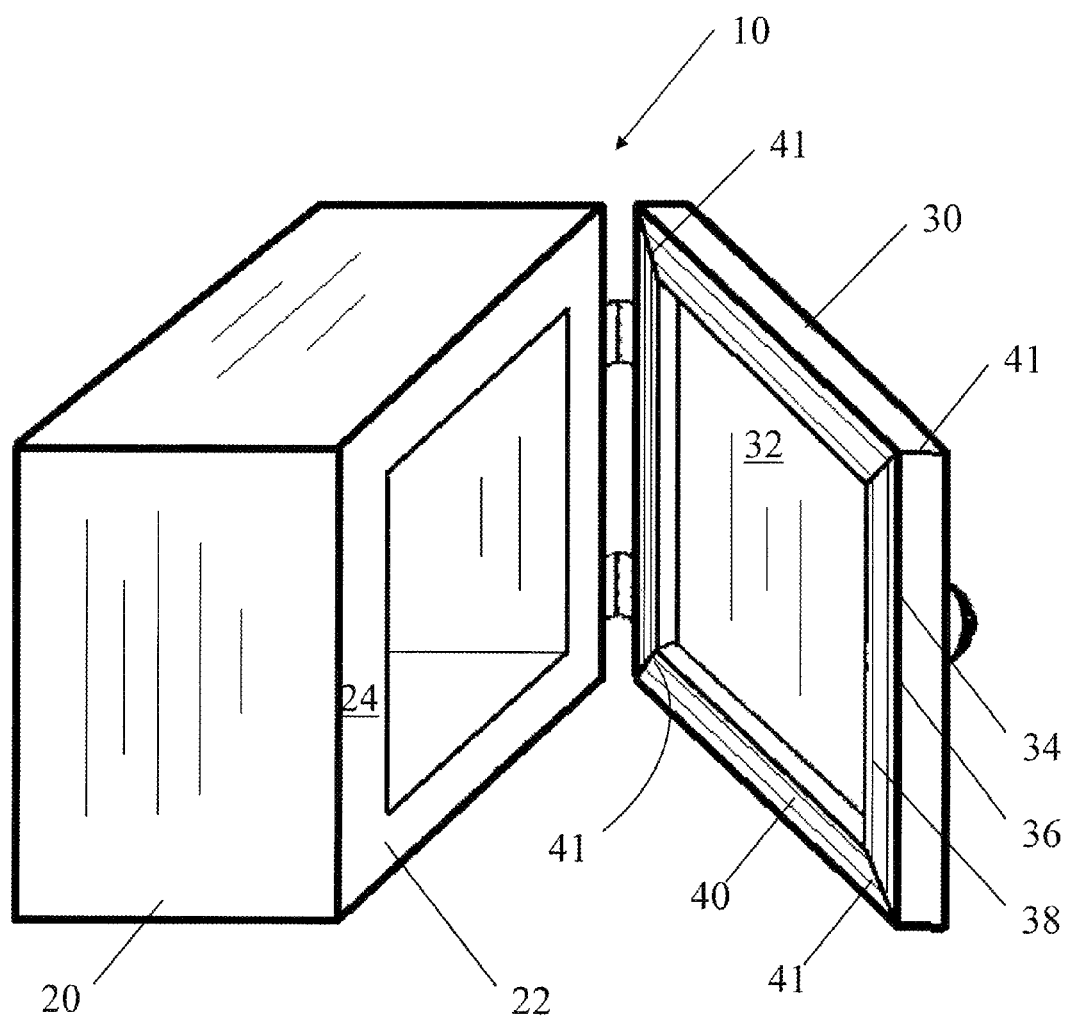
FIG. 1 is a perspective view of one embodiment of an enclosure with a strip gasket attached to the enclosure door.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "applied" and "coupled" and variations thereof are used broadly and encompass both direct and indirect mountings, connections, supports, and couplings. Further, "applied" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates one embodiment of an enclosure 10 having a body 20 and a door 30. A strip gasket 40 can be applied to an inner surface 32 of the door 30. The strip gasket 20 can be cut into precise dimensions to allow the gasket 20 to cover the outer periphery 34 of the inner surface 32 of the door 30. The outer periphery 34 of the door 30 can be configured to mate with an outer periphery 22 of a front surface 24 of the enclosure body 20 when the door 30 is closed and abuts against the enclosure body 20. In this embodiment, when the door 30 is closed against the enclosure body 20, the gasket 40 provides a seal between the outer peripheral surfaces 22, 34 of the body 20 and door 30 of the enclosure 10.

Figure 2:
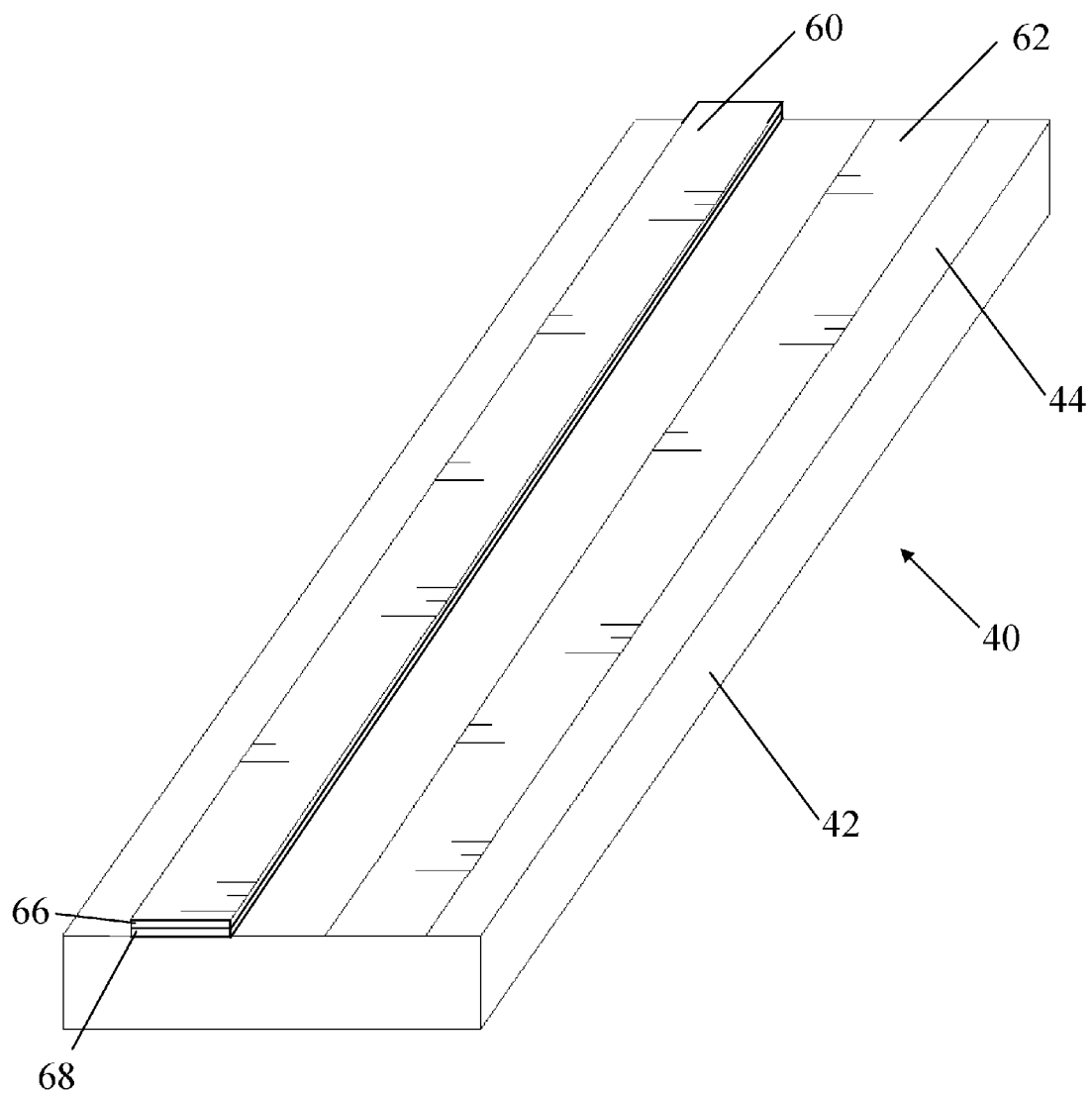
FIG. 2 is a perspective view of a first embodiment of a strip gasket having multiple adhesive strips.

FIG. 2 illustrates one embodiment of a strip gasket 40. The strip gasket 40 can be made of various materials such as foam, vinyl, synthetic rubber or silicone. The strip gasket 40 includes a base 42 and a top surface 44. In one embodiment, the base 42 of the gasket 40 is solid.

Figure 3:
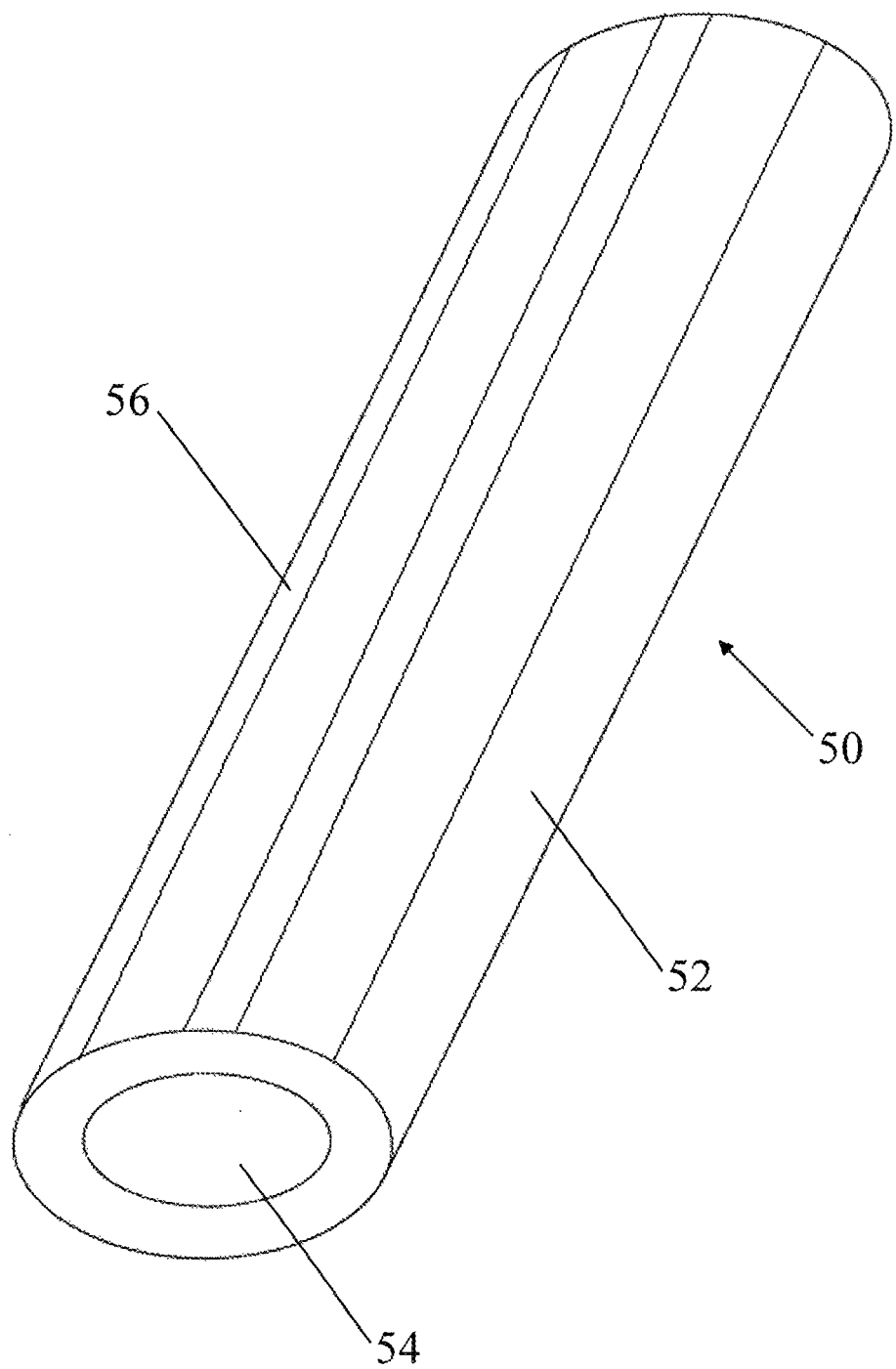
FIG. 3 is a perspective view of a second embodiment of a strip gasket having multiple adhesive strips.

FIG. 3 illustrates an alternative embodiment of a strip gasket 50. In this embodiment, the base 52 of the gasket 50 is hollow and can have an inner surface 54 and an outer surface 56. The inner surface 54 of the gasket 50 is configured to provide a hollow cross section region. It should be understood to one of ordinary skill in the art that alternative cross sectional shapes can also be used with the strip gasket 50. The gasket 50 can have cross sectional shapes such as a round shape, a rectangular shape, a "FIG. 8" shape, a "C" shape, a "D" shape, a "P" shape or other shapes known in the art. These cross sectional shapes can be solid, hollow or a combination thereof.

Referring back to FIG. 2, the strip gasket 40 includes multiple adhesive strips 60, 62. In one embodiment, the strip gasket 40 can include a first adhesive strip 60 and a second adhesive strip 62. The first adhesive strip 60 can be parallel to the second adhesive strip 62. However, the orientation of the multiple adhesive strips can be adjusted as desired by the user to provide a proper seal. The first adhesive strip 60 can also be spaced from the second adhesive strip 62. In an alternative embodiment, the first adhesive strip 60 and the second adhesive strip 62 can be proximate to one another with substantially little to no spacing between the first 60 and second 62 adhesive strips.

The first adhesive strip 60 includes an adhesive 66 and a non-stretchable carrier 68 for the adhesive 66. The non-stretchable carrier 68 for the first adhesive strip 60 helps prevent the gasket 40 from being stretched. This helps prevent the gasket 40 from shrinking over time, which can cause one portion of the gasket 40 to draw away and separate from a surrounding portion of the gasket 40 at a gasket joint 41. This separation of the gasket 40 portions could allow water and other matter to penetrate under the gasket 40 at one or more gasket joints 41.

The second adhesive strip 62 works in conjunction with the first adhesive strip 60 to create a tight seal against a surface to which the strip 60 is attached. This tight seal helps prevent water, dust and other particulate matter from passing through and around the strip 40. Having a second adhesive strip 62 also helps ensure that the strip gasket 40 completely adheres to a desired surface. Therefore, even if there are voids or spaces created between the first adhesive strip 60 and a desired surface when the first adhesive strip 60 is installed, the second adhesive strip 62 ensures that water or other particulate matter will not reach these voids or spaces.

In one embodiment, a user can apply the strip 40 such that the second adhesive strip 62 is applied proximate to an outer edge 36 of the door 30 and the first adhesive strip is applied proximate to an inner edge 38 of the door 30. The second adhesive strip 62 can be applied proximate to an outer edge 36 of the door 30 to help prevent any water or other particulate matter from passing through or around the strip 40.

Figure 4:
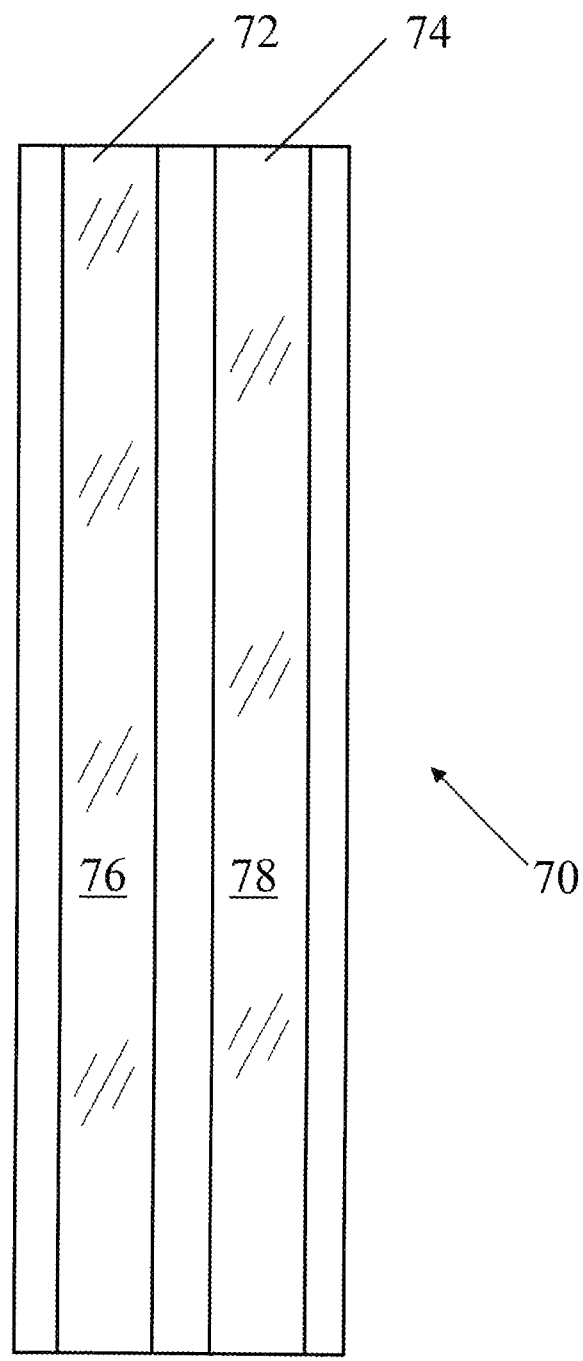
FIG. 4 is a top view of a third embodiment of a strip gasket having multiple adhesive strips and a paper covering over the multiple adhesive strips.

FIG. 4 illustrates one embodiment of a strip gasket 70. The strip gasket 70 includes a first adhesive strip 72 and a second adhesive strip 74. The first adhesive strip 72 and second adhesive strip 74 includes a first paper 76 and a second paper 78 to cover adhesive within each respective adhesive strip 72, 74 until they are ready for use. The first paper 76 can be a different color from the second paper 78 to indicate to a user that one paper covers the adhesive having a non-stretchable carrier, while the other paper covers an adhesive only. For example, the first paper 76 can be colored brown to indicate that it covers an adhesive having a non-stretchable carrier, while the second paper 78 can be colored white to indicate that it covers an adhesive only. In an alternative embodiment, the first adhesive strip 72 and second adhesive strip 74 includes a single paper to cover both adhesives within each respective adhesive strip 72, 74 until they are ready for use.

Figure 5:
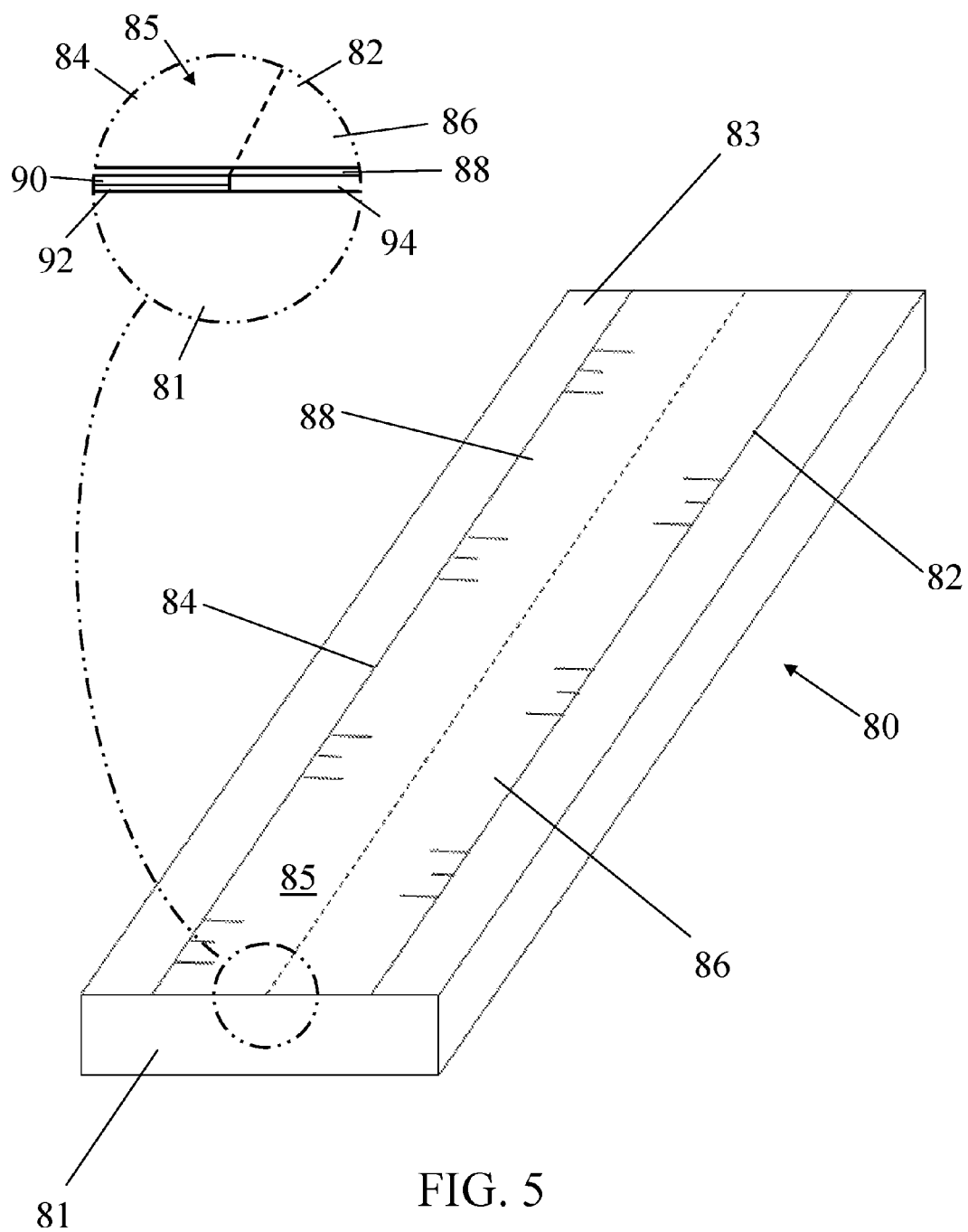
FIG. 5 is a perspective view of a fourth embodiment of a strip gasket having a single adhesive strip with a non-stretchable carrier located in a section of the adhesive.

FIG. 5 illustrates one embodiment of a strip gasket 80. The strip gasket 80 includes a base 81 and a top surface 83. The base 81 can be solid or hollow. The strip gasket 80 includes a single adhesive strip 82 and includes adhesive located on a top surface 83 of the base 81. The single adhesive strip 82 includes multiple distinct sections. In one embodiment, the adhesive strip 82 includes two distinct sections on its top surface 85: a first section 84 and a second section 86. The first section 84 of the adhesive strip 82 includes an adhesive 90 and a non-stretchable carrier 92 for the adhesive 90. The second section 86 of the adhesive strip 82 includes an adhesive 94 which can be the same substance as the adhesive 90 of the first section 84 or can be a different adhesive substance. The non-stretchable carrier 92 of the first section 84 helps to prevent the strip gasket 80 from stretching over time and the adhesive 94 of the second section 86 helps the strip 82 to completely adhere to a desired surface. The second section 86 of the adhesive strip 82 also helps prevent water and other matter from entering under the strip gasket 80 because of the tight seal created between the second section 86 and a desired surface. The single adhesive strip 82 can also include a paper 88 to cover adhesives 90, 94 within the first section 84 and second section 86 of the adhesive strip 82 until it is ready for use.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The strip gasket can be made in desired shapes from various kinds of materials available in the field and known to a person skilled in the art. This disclosure intends to cover all the equivalent embodiments and is limited only by the appended claims.

The invention claimed is:

1. A strip gasket for an enclosure, the strip gasket comprising:
    a base having a first surface;
    a first adhesive strip attached to the base and extending along the first surface, the first adhesive strip comprising:
        a first adhesive; and
        a non-stretchable carrier extending along the first surface and preventing the strip gasket from stretching or shrinking over time; and a second adhesive strip attached to the base and extending along the first surface parallel to the first adhesive strip, the second adhesive strip comprising a second adhesive that prevents ingress of water and dust under the strip gasket and into the enclosure when the strip gasket is mounted on the enclosure.

2. The strip gasket of claim 1 further comprising a first paper to cover the first adhesive strip until the strip gasket is to be mounted to the enclosure, the first paper having a first color identifying the first adhesive strip.

3. The strip gasket of claim 2 further comprising a second paper to cover the second adhesive strip until the strip gasket is to be mounted to the enclosure, the second paper having a second color identifying the second adhesive strip, the second color being different from the first color.

4. The strip gasket of claim 1 wherein the base is hollow.

5. The strip gasket of claim 1 wherein the first adhesive strip is spaced from the second adhesive strip.

6. The strip gasket of claim 1 wherein the first adhesive strip is located next to the second adhesive strip with substantially no spacing between the first adhesive strip and the second adhesive strip.

7. The strip gasket of claim 6 further comprising a paper to cover the first adhesive strip and the second adhesive strip.

8. A strip gasket for an enclosure, the strip gasket comprising:
    a base having a first surface; and
    exactly one single adhesive strip on the first surface where a first section of the single adhesive strip includes a first adhesive and a non-stretchable carrier for the first adhesive and a second section of the single adhesive strip distinct from the first section includes a second adhesive.

9. The strip gasket of claim 8 further comprising a paper to cover the single adhesive strip.

10. The strip gasket of claim 8 wherein the base is hollow.

11. The strip gasket of claim 8 wherein the first adhesive and the second adhesive are the same substance.

12. The strip gasket of claim 8, wherein the second adhesive is a different adhesive substance from the first adhesive.

13. The strip gasket of claim 8 wherein the first section and the second section cooperate to form a top surface of the single adhesive strip.

14. The strip gasket of claim 13 wherein the first section of the single adhesive strip abuts the second section of the single adhesive strip along a length of the first surface.

15. An enclosure having a strip gasket, the enclosure comprising:
    a body having a front surface wherein the front surface includes a first outer periphery portion;
    a door having an inner surface wherein the inner surface includes a second outer periphery portion; and
    a strip gasket having a base, a first adhesive strip attached to a first surface of the base, and a second adhesive strip attached to the first surface of the base, wherein the first adhesive strip includes a non-stretchable carrier extending along the first surface and preventing the strip gasket from stretching or shrinking over time, and the second adhesive strip comprises a second adhesive that prevents ingress of water and dust under the strip gasket and into the enclosure when the strip gasket is mounted on the enclosure;
    wherein the strip gasket is applied along the second outer periphery portion of the door such that the strip gasket can come in contact with the first outer periphery of the body when the door is closed and abuts against the front surface of the body.

16. The enclosure of claim 15 wherein the first adhesive strip is spaced from the second adhesive strip.

17. The strip gasket of claim 15 wherein the first adhesive strip is located next to the second adhesive strip with substantially no spacing between the first adhesive strip and the second adhesive strip.

18. The enclosure of claim 15 further comprising a first paper to cover at least the first adhesive strip.

19. The enclosure of claim 18 wherein the first paper covers the first adhesive strip and has a first color, the enclosure further comprising a second paper covering the second adhesive strip and having a second color different from the first color.

* * * * *